(12) United States Patent
Brum

(10) Patent No.: US 7,335,326 B2
(45) Date of Patent: Feb. 26, 2008

(54) METHOD AND APPARATUS FOR MOLDING DUAL CORE ASSEMBLIES

(75) Inventor: William Brum, Raynham, MA (US)

(73) Assignee: Acushnet Company, Fairhaven, MA (US)

( * ) Notice: Subject to any disclaimer, the term of this patent is extended or adjusted under 35 U.S.C. 154(b) by 338 days.

(21) Appl. No.: 10/442,252

(22) Filed: May 21, 2003

(65) Prior Publication Data

US 2004/0232577 A1    Nov. 25, 2004

(51) Int. Cl.
*B29C 43/02* (2006.01)
*B29C 43/18* (2006.01)

(52) U.S. Cl. ............... 264/248; 264/297.5; 264/297.8; 264/250; 264/279.1; 264/255

(58) Field of Classification Search ............ 264/297.5, 264/297.8, 248, 250, 279.1
See application file for complete search history.

(56) References Cited

U.S. PATENT DOCUMENTS

| | | | | |
|---|---|---|---|---|
| 1,400,146 A | * | 12/1921 | Eggers et al. ............... | 156/196 |
| 1,481,866 A | * | 1/1924 | Heist ........................... | 156/199 |
| 1,575,388 A | * | 3/1926 | Roberts ........................ | 156/81 |
| 1,883,704 A | * | 10/1932 | Goodwin ..................... | 156/213 |
| 2,253,291 A | * | 8/1941 | Franknol ..................... | 156/196 |
| 3,933,967 A | | 1/1976 | Taylor ........................ | 264/248 |
| 4,389,365 A | * | 6/1983 | Kudriavetz ............... | 264/297.8 |
| 5,334,673 A | | 8/1994 | Wu ........................ | 273/235 R |
| 5,484,870 A | | 1/1996 | Wu ............................. | 528/28 |
| 6,056,842 A | * | 5/2000 | Dalton et al. ............... | 156/243 |
| 6,096,255 A | * | 8/2000 | Brown et al. ................ | 264/248 |
| 6,106,656 A | * | 8/2000 | Maruoka et al. ............ | 156/292 |
| 6,132,544 A | * | 10/2000 | Ihara ........................... | 156/146 |
| 6,290,797 B1 | | 9/2001 | Gosetti et al. .............. | 156/228 |
| 6,302,808 B1 | | 10/2001 | Dalton et al. ............... | 473/371 |
| 6,303,065 B1 | | 10/2001 | Reid, Jr. et al. ............ | 264/248 |
| 6,468,381 B1 | | 10/2002 | Morgan .................. | 156/244.19 |
| 6,645,414 B2 | * | 11/2003 | Reid et al. ................... | 264/248 |
| 6,846,442 B2 | * | 1/2005 | Sugimoto .................... | 264/161 |

* cited by examiner

*Primary Examiner*—Edmund H. Lee
(74) *Attorney, Agent, or Firm*—Bingham McCutchen LLP

(57) ABSTRACT

An improved apparatus and method for forming a golf ball is described. The method includes utilizing strands of a desired material. The method employs a top, center and bottom plate. The strands are placed over the concave cavities of a lower plate and over the hemispherical protrusions of a center plate. The three plates are then placed in a press, along with a top plate, thereby forming two sets of hemispherical shells. One set of shells remains in the cavities of the top plate, and one set remains in the cavities of the bottom plate. Centers are placed inside the hemispherical shells of the bottom plate. The two sets of shells are then brought together to form a complete core. A cover may be added to complete the formation of a golf ball.

22 Claims, 10 Drawing Sheets

STEP 1

STEP 2

STEP 3

STEP 4

STEP 5

METHOD AND APPARATUS FOR MOLDING DUAL CORE ASSEMBLIES

FIELD OF THE INVENTION

The present invention relates to an improved apparatus and method of forming dual core golf balls. More specifically, the present invention relates to an apparatus and method that utilizes elastomer strands as preforms for forming outer shells of a dual core construction.

BACKGROUND OF THE INVENTION

Generally, golf balls have been classified as solid balls or wound balls. Solid balls are typically comprised of a solid, polymeric core and a cover. These balls are generally easy to manufacture, but are regarded as having non-optimal or limited playing characteristics. Wound balls are comprised of a solid or liquid-filled center surrounded by tensioned elastomeric material and a cover. Wound balls generally have good playing characteristics, but are more difficult to manufacture than solid balls.

The prior art is comprised of various golf balls that have been designed to provide optimal playing characteristics. These characteristics include the initial velocity and spin of the golf ball, which can be optimized for various calibers of players. For instance, certain players prefer to play a ball that is softer feeling and has a high spin rate that allows the player to control or "work" the ball. However, balls of this nature tend to exhibit a slight decrease in distance due to the high spin rate. Other players prefer to play a ball that has a low spin rate to maximize distance. These balls, however, tend to be hard feeling and difficult to control around the greens.

Methods for producing golf balls having an ideal combination of the above mentioned desirable characteristics have been many. Manufacturers have molded layers around a solid center by placing a preformed center between two blocks of core material in a spherical compression mold, and closing the mold. This process, however, provides little control over the ultimate placement of the center within the golf ball core. Large variations in the location of the center can result and are extremely detrimental to ultimate golf ball performance. Another method that improves the centering of a solid center involves forming two hemispherical polymer cups with two mold halves that, when placed together, create a hollow cavity in which the solid center rests. The two cups are then heated above the curing temperature of the polymeric material, under compression, to form the golf ball core. However, although centering is improved, at certain desirable temperatures (typically higher) and material compositions (low levels of reinforcing polymer), the cups tend to pull away from the surface of the molds, which can result in a slightly off-center solid center because of displaced shell material.

When using methods that mold two cups together using heat, several concerns may occur. It is typically desirable to have a golf ball with uniform properties so that the ball may not respond differently when struck in one position versus another. In addition to achieving proper placement of a center, these concerns typically also involve the construction and dimple pattern on the outer cover of the ball.

A lack of uniformity in the construction or properties of other portions of the ball also may adversely affect ball performance. For example, when two cups are heated and molded together, the area of the ball around the parting line of the mold plates may have different properties than the rest of the molded ball component. The durability, elasticity, hardness, and the like, may be significantly different from other portions of the molded component. In addition, the molded component may have flash, or excess molding material, on the portion of the component corresponding to the parting line of the mold plates. Because prior molding processes only allow a small space for flash material to form, the application of heat and pressure that is involved in the molding process on the thin layer of flash material can cause it to cure at a much faster rate and to a much greater degree than the material that forms most of the molded component. This "super cured" region may extend into portions of the ball near the parting line of the mold, thereby allowing a portion of the ball to have different properties than other portions.

In addition to possibly causing the molded component to have non-uniform properties, the application of heat and pressure to this thin layer of flash can also make the removal of this material more difficult and/or time consuming. Usually, any excess material remaining on the molded ball component must be removed after the component has been removed from the mold. If the flash material is "super cured" as described above, it may be harder, and therefore more difficult to remove, than material having properties and a cure state more similar to the molded component. Because it is preferred that the molded component remain substantially spherical, the removal of this excess material can be costly and time consuming. Additionally, the by-product of processes involved in removing flash material while maintaining the molded component's substantially spherical shape usually is a sludge-like material of fine particulate material that can be difficult to reprocess.

In addition, prior art processes for forming a multi-layer core typically involved individually loading each cavity of a mold plate with material for forming the component. For instance, forming the outer shell of a dual core previously involved individually loading raw material into each cavity of a mold plate. Moreover, conventional process for loading raw material also usually require that the material be loaded with a particular orientation in order to better assure that the material would completely fill the cavity without leaving voids or trapped pockets of air during molding. The loading and orienting of the raw material into each cavity of a mold is a time consuming process.

Yet another disadvantage of current molding processes is that once the component is formed, it can be difficult to remove some of the molded components from the opened mold. The matrix of golf ball components that are molded at the same time often may not be sufficiently strong to assist in pulling a stuck component out of a cavity. Thus, attempts to remove stuck components by pulling on the flash material may only result in the flash material prematurely tearing away from the component while it is still in the mold. Removal of trapped components under conditions such as these can increase maintenance costs and reduce manufacturing efficiently by keeping the molding equipment out of service until the trapped component can be removed.

Therefore, what is desired is an improved and more efficient method of molding multi-layer cores that employs a center plate for compression molding.

SUMMARY OF THE INVENTION

The present invention is directed toward a method and apparatus for forming dual core assemblies for a golf ball.

One embodiment of the present invention relates to a method of forming a multilayer golf ball core involving the step of forming a first core shell by placing a first strand of core material over a first mold plate having a plurality of cavities formed therein. The strand of core material is placed over at least a portion of the cavities. Once the strand is positioned over on the mold plate, a center plate is then placed over the first mold plate. The center plate has a plurality of top and bottom protrusions that are aligned with the cavities of the first mold plate. The center plate may then be compressed over the first mold plate. Alternatively, the center plate may be only partially closed so that the first strand of core material is in contact with both the first mold plate and the center plate.

This method further involves the step of forming a second shell by placing a second strand of core material over the protrusions of the center plate on side opposite from the first mold plate. The strand may cover at least a portion of the protrusions. After the strand is in position, a second mold plate having a similar arrangement of cavities as the first mold plate is positioned over the center plate. The center plate may be partially closed so that the second strand of core material is in contact with both the center plate and the second mold plate.

The strands of core materials are compressed between the mold plates and center plate to form first and second shells. Preferably the first and second mold plates are compressed toward the center plate at the substantially the same time to form a plurality of shells. As the protrusions of the center plate are moved into the cavities of the first and second mold plates, the strands of core material flows into and fills the plurality of cavities in the first and second mold plates.

Preferably, the amount of core material used to form the strands is greater than the volume of the voids between the protrusions of the center plate and the cavities of the mold plates when the plates are in their final, closed position. Additionally, the mold plate and center plate, when fully closed, define a gap or space between the plates through which excess mold material may flow. In one embodiment, the area of the gap or space between the mold plate and center plate is defined at its perimeter by raised and/or recessed structure on the mold plate. As the mold plate and center plate are compressed together, the excess material flows into the gap or space to form a pad of material.

Another embodiment of the present invention further involves the steps of inserting a center into one of the first plurality of shells formed by the steps described above. A second plurality of shells may then be placed over the center and joined with the first plurality of shells. The first and second plurality of shells may then be compressed together under heat and pressure to join the shells together. The heat and pressure preferably causes at least the mating surfaces of the first and second plurality of shells to crosslink together.

In a preferred embodiment, the steps of inserting a center and joining the first and second plurality of shells together occurs in the same molding apparatus as used to form the shells. In particular, after the first mold plate, center plate, and second mold plate have compressed the strands of core material, the plates are opened and the center plate is removed to expose the cavities of the newly formed shells. Centers are then placed in the newly formed shells while the shells are still in the mold plates. Then, the top and bottom mold plates are compressed together to join the plurality of first and second shells under heat and pressure. In this manner, the shells are crosslinked together to form an outer core layer around the center. The top and bottom mold plates are then opened and the newly formed multilayer cores may be removed from the mold.

As mentioned above, in one embodiment of the invention the top and bottom mold plates are configured and adapted such that excess core material forms a pad of material around the cores. Preferably, the pad is sufficiently thick to permit removal of the newly formed cores from the mold without the pad separating from the newly formed cores. In another embodiment, the pad is sufficiently thick to allow transferal and storage of the newly formed cores as an integral unit. Additionally, the pad may be sufficiently thick to substantially reduce overcuring of core material at the parting line of the newly formed cores.

In one embodiment of the invention, the thickness of the pad is from about 0.015 to about 0.30 inch thick, while in another embodiment it is between about 0.20 and 0.25 inch thick. In yet another embodiment of the invention, the physical properties of the material forming the core near the parting line are substantially similar to the physical properties of material forming other areas of the core.

The cores may be separated from the pad of excess material at any convenient time. The cores may be removed, for instance, by placing the pad and cores over a frame having a plurality of openings or apertures corresponding to the location of the cores in the pad. The apertures or openings may have a cutting edge disposed against the pad near the parting line of the cores. Forces may then be applied to the cores to force them through the openings or apertures of the frame. The pad of excess material may then be recycled by regrinding it into the material used to form the strips of core material.

Once removed from the pad of excess material, the cores may then be further processed to complete the manufacture of the golf ball. For instance, the core may be treated to remove any residual pad material. In one embodiment of the invention, the residual pad material has a substantially small affinity for said cores. The surface may be treated to increase adhesion with another layer of material formed over the core. Other additional processing of the cores may involve forming a cover or intermediate layer around the core.

Another aspect of the present invention relates to a molding apparatus for forming a multilayer core of a golf ball. In one embodiment, the apparatus has a first mold plate, a center plate, and a second mold plate. The first and second mold plates define a first and second plurality of cavities, respectively, and the center plate has a plurality of protrusions disposed on its surface at locations corresponding to the locations of the first and second plurality of cavities. The first, second, and center mold plates are configured and adapted so that a pad of excess material is formed around the molded cores. As described above, some embodiments of the invention are directed to particular thickness ranges of the pad of excess material.

Some embodiments of the invention are directed toward the arrangement of the plurality of cavities in the mold plate. For instance, in one embodiment the first and second plurality of cavities of the first and second mold plates may be arranged in staggered rows. In another embodiment, the plurality of cavities may be arranged such that they generally correspond to a geometric shape, such as a square, rectangle, trapezoid, or the like.

In addition, one or both of the mold plates may have a reservoir formed on the surface of the plate. Preferably, the reservoir forms at least part of a perimeter around the plurality of cavities. The reservoir may fully surround the plurality of cavities, but in some embodiments the reservoir may only be disposed on one, two, or three sides of the plurality of cavities.

Some embodiments of the present invention relate to the shape, location, and dimensions of the reservoir. For instance, the reservoir may generally correspond to a geometric shape, such as a square, rectangle, trapezoid, or the like. In one embodiment, the reservoir has a substantially trapezoidal shape and is disposed around a plurality of staggered cavities. Preferably, reservoirs are formed on the first and second mold plates in similar configurations. In one embodiment, the width of the reservoir is from about 0.40 to about 0.5 inch. In another embodiment, the depth of the reservoir is from about 1/16 to about 1.5 inches deep. In yet another embodiment the reservoir is from about 0.125 to about 0.25 inch deep.

DETAILED DESCRIPTION OF THE PREFERRED EMBODIMENTS

Figure 1:
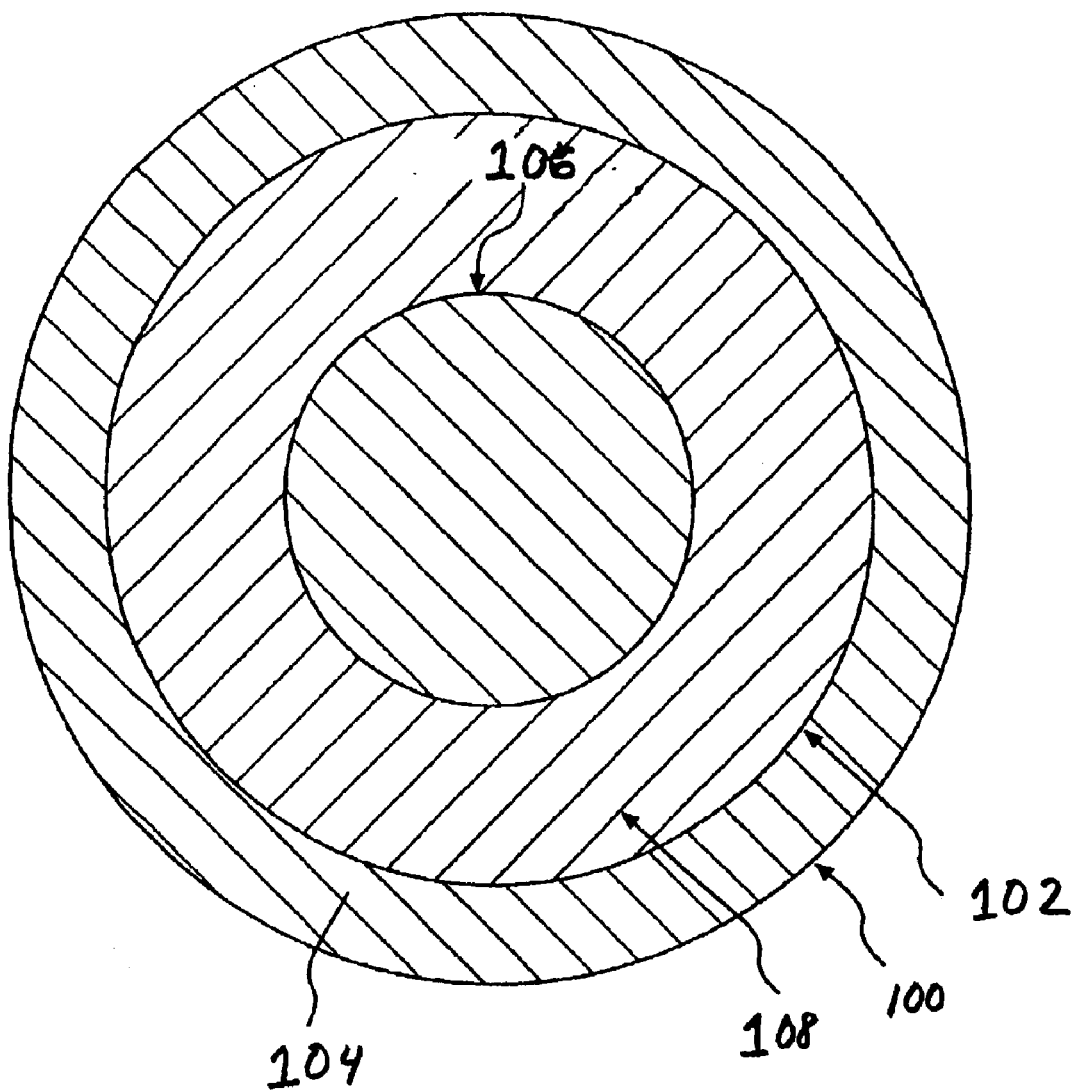
FIG. 1 is a sectional view of a golf ball made according to the method of the present invention.

Referring to FIG. 1, the present invention is directed to a method of forming a multiple piece component of a golf ball 100. More particularly, the method is directed to a method of forming a golf ball 100 having a core 102 and a cover 104, wherein the core 102 is comprised of a center 106 and an outer core layer 108. The center can be a liquid-filled center having a shell filled with a fluid or, the center can be solid.

As set forth above, the present invention is primarily directed to an improved and more efficient apparatus and method for forming a multi-layer core wherein the surface of at least the outer layer 108 that has substantially uniform properties. The method of forming the centers and cover is set forth in more detail below.

In a preferred embodiment, the present invention comprises a three plate mold configuration that is used to form the outer layer 108 of a golf ball. In such an embodiment, the top mold plate is preferably fixed in place. The center plate, or core plate, is preferably movable in both the vertical and horizontal planes. The bottom plate is preferably movable in any direction. The plates may have any desired size or shape.

According to a preferred embodiment of the present invention, the top plate is fixed. In order to form the outer layer 108, the middle plate is preferably capable of being placed at a desired distance below the top plate. The bottom plate may be placed at a desired distance below the center plate. Both the top and bottom plates have rows of concave cavities, and the center plate has rows of hemispherical protrusions. The properties of each of the plates are described in further detail below.

According to the method of the present invention, the plates are aligned as described above. Rather than individually loading and orienting raw material into each cavity, a strip of elastomeric material is then placed over each row of concave cavities on the bottom plate. Strips of elastomeric material are also placed over the hemispherical protrusions located on the top of the center plate. The three plates are then forced together, thereby forcing the elastomeric material into the concave mold parts of the top and bottom plates. After a desired period of time, the plates are separated. As a result, hemispherical cups are formed in both the top and bottom plates. The center plate is then removed so that it is no longer in between the top and bottom plates. A center may then be inserted into each of the hemispherical cups on the bottom plate. The top and bottom plates are then forced together, thereby fusing the cups with the centers inside.

When the hemispherical cups are formed, and when they are fused together, excess elastomeric material is squeezed out of the concave cavities. In order to capture this excess material, both the top and bottom plates have a reservoir that is located around the periphery of the plates. Excess material, of flash, that is forced out of the concave cavities flows into the areas between the concave cavities and into the reservoir. Preferably, the flash is sufficiently thick so that portions of the molded component near the parting line of the mold does not have significantly different properties than other portions of the component. In one embodiment, the thickness of the flash is from about 0.015 to about 0.030 inches, and more preferably is from about 0.020 to about 0.025 inches thick. The thickness of the flash may be controlled by manipulating the distance between the three plates when they are compressed.

After the top and bottom hemispherical cups are fused together, the top and bottom plates are separated, resulting in a sheet of molded cores in the lower plate. Because of the flash that flows between the concave mold portions, each of the cores are connected together. Thus, the entire sheet of molded core components may be removed from the bottom plate. It is preferred that the webbing that is formed between each of the molded core components preferably is sufficiently strong to allow the matrix of molded components to be removed, stored, and transferred as a single unit. In one embodiment, the webbing of flash material has substantially the same mechanical properties as the molded layer. For instance, shear and tensile properties of the webbing are preferably within about 5 percent of the properties of the molded layer, and more preferably, are within about 2 percent, so that the molded components are not separated from each other during demolding, storage, or transfer until desired.

Each of the molded components may be punched out of the webbing or matrix of material to form individual cores. Because the webbing of material surrounding the component is thicker than ordinary tolerances for flash material, the webbing is less susceptible to becoming hardened unnecessarily from being super-cured. As a result, it is believed that the portions of the ball near the parting line of the mold, i.e., the region within about 1/8 inches of the parting line of the mold, will have substantially similar properties as the other portions of the molded component. For purposes of explaining the present invention, it is preferred that "substantially similar" means that the material properties differ by no more than about 5 percent, and even more preferably that they differ by no more than about 2 percent.

Once removed from the sheet of molded components, the cores are then processed to remove any flash that remains on the periphery of the ball. Once the flash is removed, additional layers, such as a cover layer or another core layer, then may be molded onto the component. Any known method of adding an additional layer, including the process described herein for molding core layers, may be used. Other processes for forming another layer around the molded component include, without limitation, compression molding, injection molding, casting, or reaction injection molding. Each aspect of the invention is discussed in more detail below.

Figure 2A:
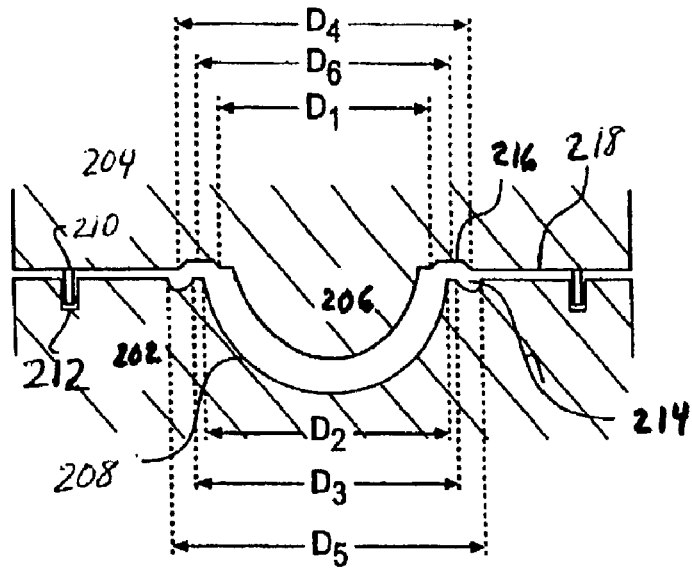
FIGS. 2a and 2b are diagrams showing an exemplary hemispherical protrusion and concave cavity according to the present invention.
Figure 2B:
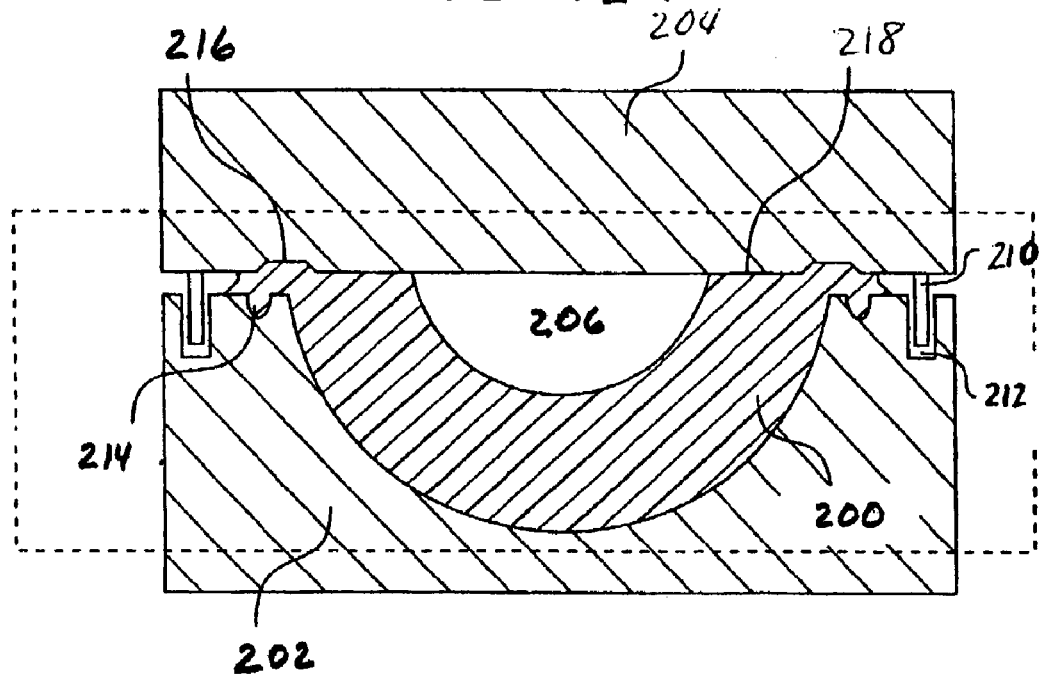

Referring now to FIGS. 2a and 2b, the outer layer 108 is formed by first forming hemispherical cups 200. Only the formation of one cup is shown in FIGS. 2a and 2b. However, in a preferred embodiment, the hemispherical cups 200 are formed in the concave cavities of the top and bottom plates substantially simultaneously. Each cup 200 is formed as shown in FIG. 2b, by compression molding a desired material, preferably polybutadiene-based elastomer, between a first substantially hemispherical concave mold part 202 having a cavity and a substantially hemispherical protrusive mold part 204. In a preferred embodiment, the protrusive mold part 204 has a first substantially hemispherical protrusion 206 that faces and cooperates with the concave cavity 208. The protrusive mold part 204 includes a plurality of alignment pins 210 that mate with a plurality of bores 212 in the concave mold part 202. As the mold parts 202 and 204 are moved toward each other to form the cups, the pins 210 align with the bores 212 to make sure that the protrusion 206 is concentric, or coaxially aligns with the cavity 208. Preferably, the protrusion 206 and cavity 208 align coaxially to form a cup-shaped cavity having a substantially uniform thickness substantially equal to the thickness of the golf ball core outer layer 108. In some embodiments, the concave mold part 202 may have a circumferential groove 214 surrounding the cavity that has an inner diameter $D_3$ and an outer diameter $D_5$, the inner diameter $D_3$ being greater than the cavity diameter $D_2$.

In one embodiment, the protrusive mold part 204 has a channel 216, having a depth, width, and a plurality of radii, cut into the face 218, the channel being concentric about the hemispherical protrusion 206. The channel 216 has an inner diameter $D_1$ and an outer diameter $D_4$. The channel outer diameter, as used herein, is defined as the diameter of the circle formed by the outer sidewall of the channel. The channel inner diameter, as used herein, is defined as the diameter of the circle formed by the inner sidewall of the channel. Preferably, the channel inner diameter $D_1$ is less than the cavity diameter $D_2$ and the channel outer diameter $D_4$ is greater than the groove inner diameter $D_3$. The channel also has a center diameter $D_6$, defined as the diameter of a circle formed by the channel when measured at a point half way between the channel outer diameter $D_4$ and the channel inner diameter $D_1$. In a most preferred embodiment, the channel center diameter is substantially the same as the cavity diameter $D_2$, such that part, but not all of the channel overlaps the outer edge of the hemispherical cavity in the concave mold part 202. The overlap, in conjunction with the channel, allows controlled flow of excess cup material to the channel and formation of a polymer bridge between the cup and the excess polymer in the groove 214. Preferably, the channel inner diameter $D_1$ is between about 95% and 99.5% of the cavity diameter $D_2$. Alternatively, the channel outer diameter $D_4$ is between about 100.5% and 105% of the groove inner diameter $D_3$.

Figure 3:
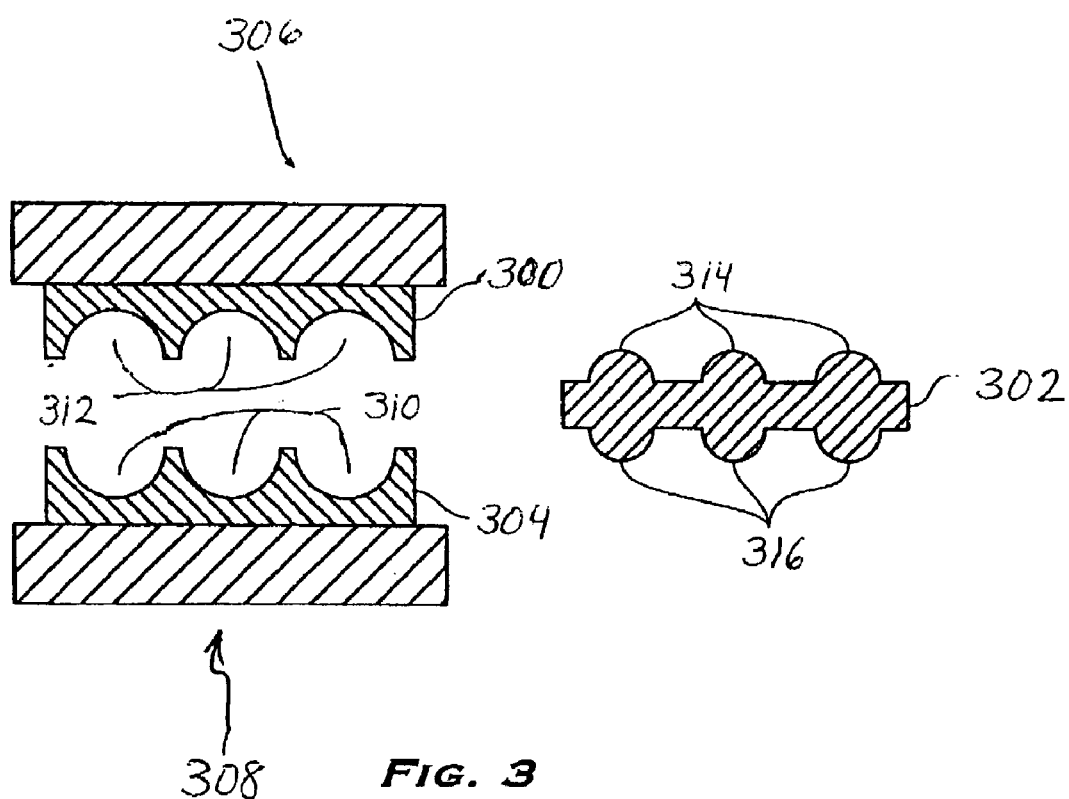
FIG. 3 is a diagram showing exemplary plates according to the present invention.

In a preferred embodiment, the present invention comprises a top 300, center 302, and bottom plate 304, shown in FIG. 3. In a preferred embodiment, the top and bottom plates 300 and 304 are attached to plates 306 and 308, which serve as supports. The top plate 300 is preferably fixed. The top 300 and bottom 304 plates may have any desired number of concave cavities 310 and 312. The center plate 302 has a corresponding number of hemispherical protrusions 314 and 316. Though only three cavities 310 and 312 are shown in the exemplary figure, it will be understood that any number of cavities and corresponding protrusions may be employed.

In a preferred embodiment, the top plate has a plurality of upper cups 312 and the bottom plate has a plurality of lower cavities 310. The protrusions 314 on the top of the center plate 302 correspond with the upper cavities 312 and the protrusions 316 on the bottom of the center plate 302 correspond with the lower cavities 310. The cavities 310 and 312 of bottom and top plates 304 and 300, respectively, are oriented toward each other and in alignment with the upper and lower protrusions 314 and 316 of the center plate 302. Such an alignment allows the top and bottom cavities 312 and 310 to mate with the top and bottom protrusions 314 and 316 of the center plate 302.

In a preferred embodiment, the distance between the center plate 302 and the top 300 and bottom 304 plates, when they are forced together, are controlled by changing the length of the pins 210 and the depth of the bores 212. In a preferred embodiment, the distance is preferably chosen so that the thickness of the flash is sufficient to prevent the material from breaking when it is removed from the lower plate 304. Preferably, the thickness of the flash is between 0.015 and 0.30 inches, and more preferably the thickness of the flash is between 0.20 and 0.25 inches.

Figure 4A:
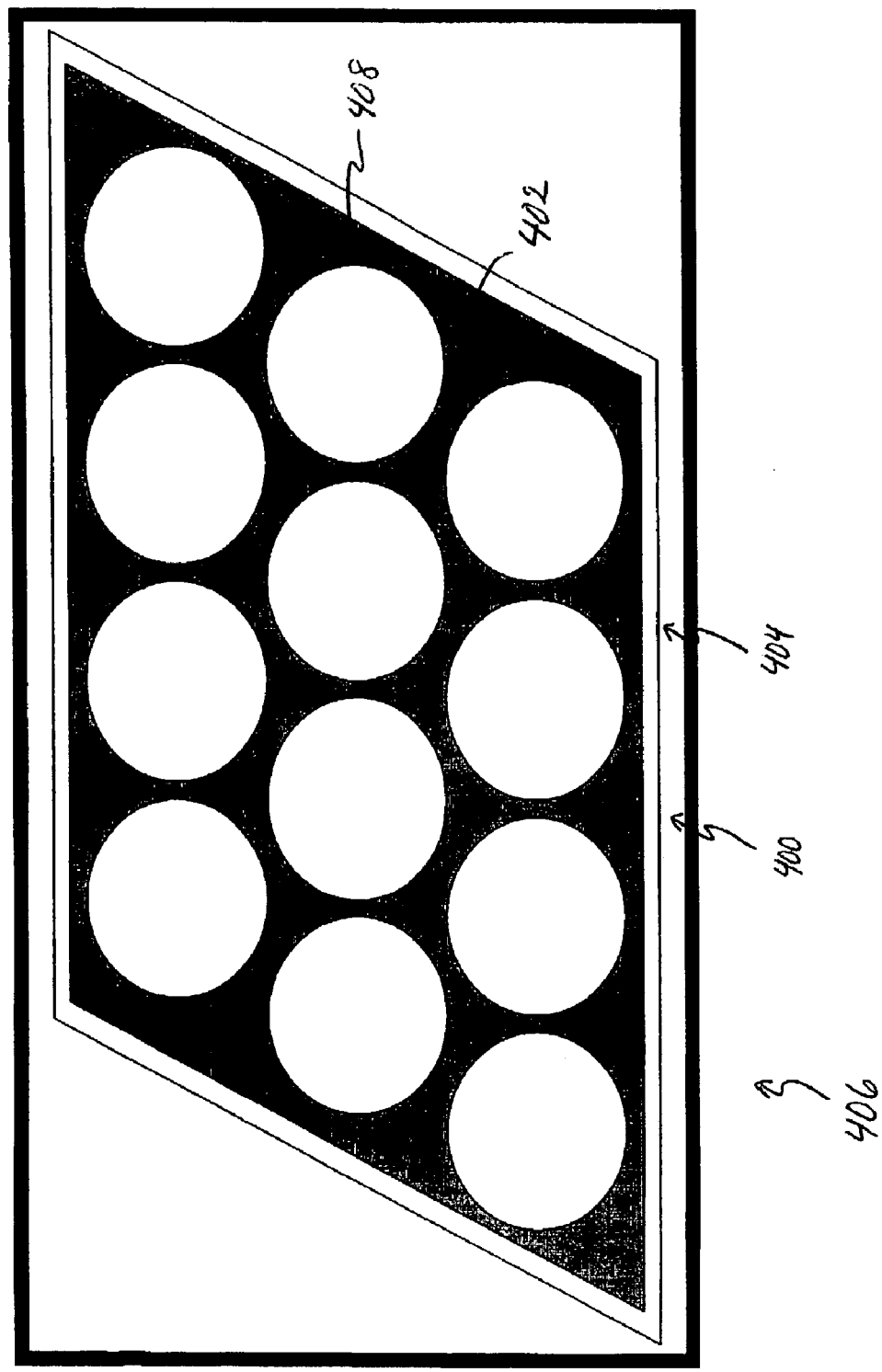
FIGS. 4a, 4b, and 4c are diagrams showing exemplary layouts of the top and bottom plates according to the present invention.
Figure 4B:
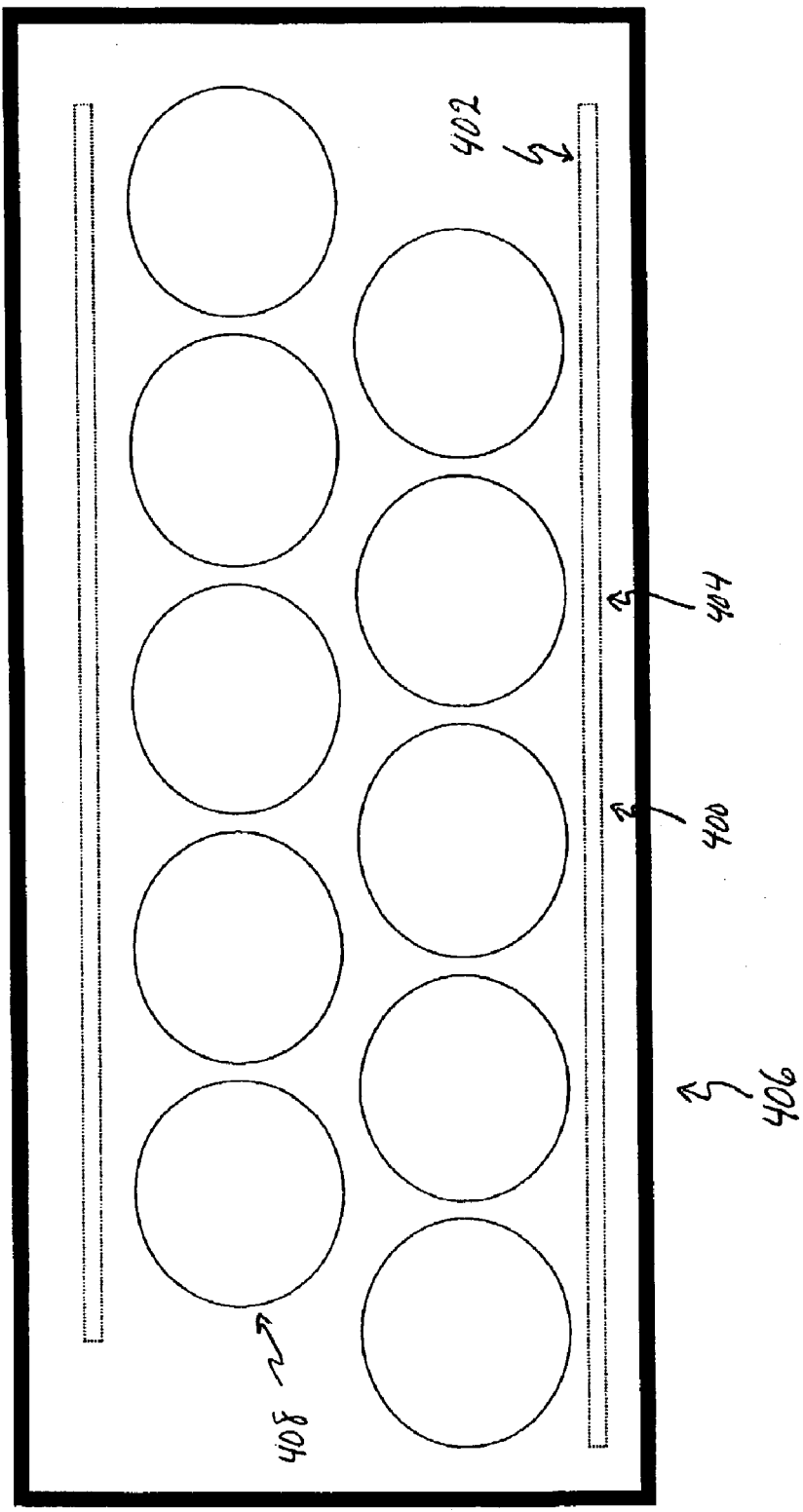
Figure 4C:
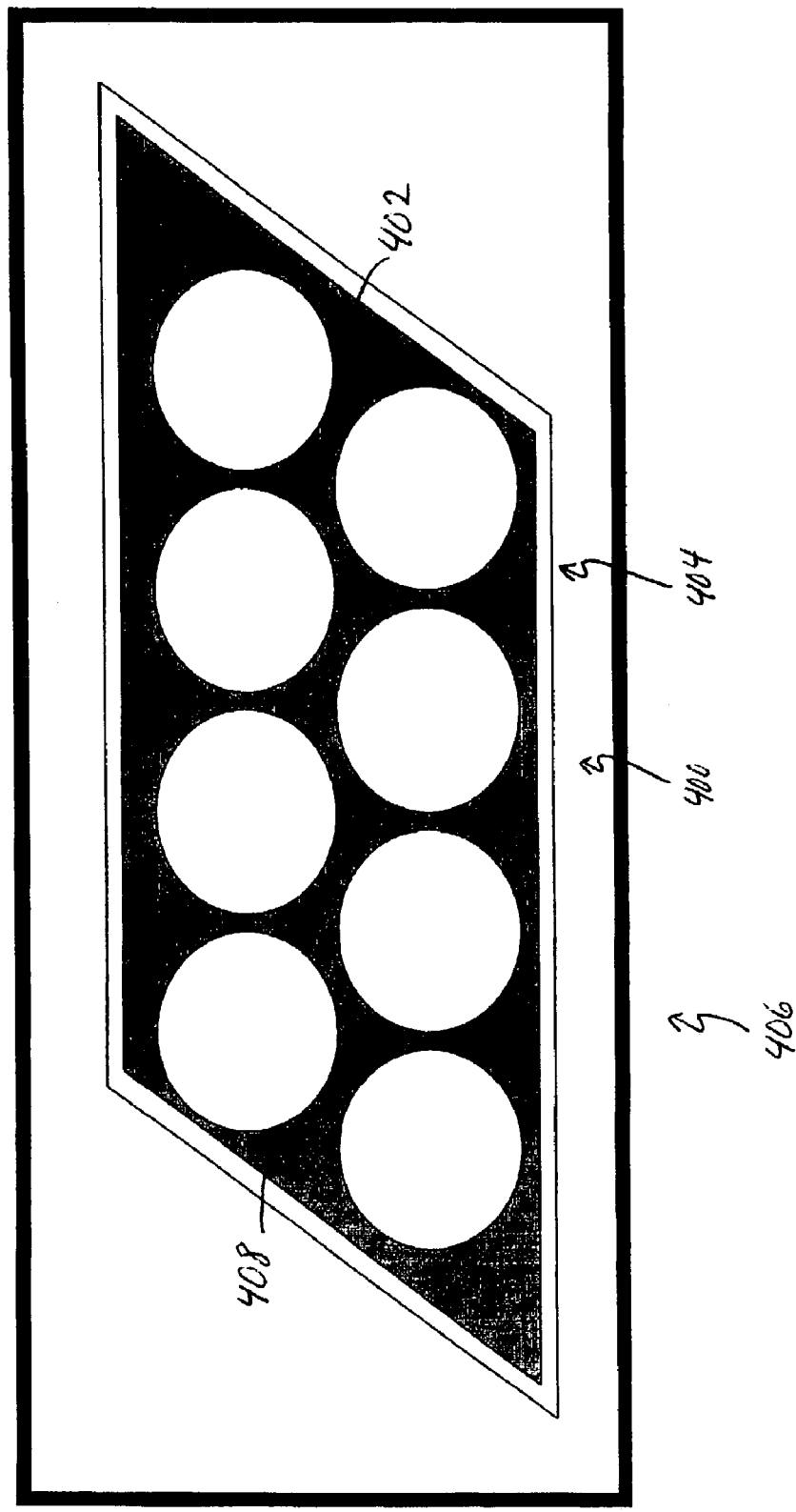

In a preferred embodiment, a reservoir 400 is present around the periphery of the top and bottom plates, as shown in FIGS. 4a and 4c. The reservoir comprises an inner 402 and outer 404 edge. Flash that does not flow into the cups 408 flows into the spaces between the cups (shaded in the FIG. 4a) and into the reservoir 400. The reservoir does not have to lie along the entire periphery of the plate 406. In other embodiments, the reservoir may lie along two sides of the plate 406, as shown in FIG. 4b. The location of the reservoir may be determined by those skilled in the art.

In a preferred embodiment, the reservoir 400 has a substantially trapezoidal shape, as shown in FIGS. 4a and 4c. The corners of the trapezoid may be curved or otherwise modified so that the reservoir area corresponds more closely to the perimeter of the plurality of cavities near the reservoir. Additionally, the reservoir may not extend completely along a side or along a pair of sides to form a corner. Thus, the reservoir may not extend along the entire length of the sides of the trapezoid to form one or more corners of the trapezoid. The acute angled corners of a trapezoid, for example, may not have a reservoir. Additionally, a reservoir need not fully surround the plurality of cavities. For example, a reservoir may only be disposed on two sides of the cavities, such as along the long sides of the trapezoid.

While a generally trapezoidal shape is preferred, the reservoir may form or approximate other shapes as well. For instance, the reservoir may have a generally square or rectangular shape, or may be oval or rounded in some manner. In another embodiment, the reservoir may not fully surround the cavities. For instance, reservoirs may be on opposing sides of a row or plurality of rows of cavities. The shape and configuration of the reservoir 400 may depend on factors such as the arrangement of the cavities 408, the material being molded, and the molding conditions. Additionally, the dimensions of the reservoir 400 do not have to be uniform, and may be varied as desired. Though the exemplary plate in FIGS. 4a-c are shown with only a limited number of rows of cavities 408, it will be understood that any number of rows, containing any number of cavities, may be present on a plate.

The distance between the inner 402 and outer 404 edges of the reservoir may be varied as desired. In some embodiments, the distance between the edges 402 and 404 may be varied according to the properties of the materials used to form the outer layer 108. Properties such as viscosity, or the like, may be considered. In other embodiments, the distance between the edges 402 and 404 may be chosen in order to vary the thickness of the material that collects in the reservoir 400. The thickness of the material may be important in applications where it is desirable to remove the entire mold from the plate 406 without breaking it. Preferably, the distance between the edges of the reservoir is between 0.05 and 0.90 inches. More preferably, the distance between the edges of the reservoir is between 0.30 and 0.60 inches. Most preferably, the distance between the edges of the reservoir is between 0.40 and 0.50 inches.

The distance between the edge of the plate 406 and the outer edge 404 of the reservoir may be varied as desired. In some embodiments, it may be desirable to have the outer edge 404 away from the edge of the plate 406 to ensure that excess flash does not overflow. The distance between the inner edge 402 and the cups 408 may also be varied as desired. The distance between the inner edge 402 and the cups 408 is preferably varied in order to position the reservoir 400 substantially close to the cups 408 in order to capture excess material. In one embodiment, for example, the shortest distance from an inner edge of the reservoir to the edge of a cavity is from about 0.125 to about 1.5 inches. In another embodiment, the shortest distance is from about 0.25 to about 1.0 inch, and in another embodiment the shortest distance is greater than about 0.375 inches. With the present invention in mind, a skilled artisan would appreciate that the placement of the inner 402 and outer 404 edges may be varied according to a particular application.

In some embodiments, it may be desirable to change the depth of the reservoir 400. The depth may be chosen based on the amount of material used to form the outer layer 108, or any of the other properties discussed above. In one embodiment of the invention, the depth of the reservoir 400 is between about 1/16 and about 1.5 inches. In another embodiment, the depth of the reservoir is between about 1/8 and about 3/4 inch. Most preferably, the depth of the reservoir is between about 1/8 and about 1/4 inch.

In a preferred embodiment of the present invention, the placement of each of the cavities 310 and 312 are staggered. The cavities 310 and 312 are preferably staggered in order to reduce material waste and improve cavity filling. The protrusions 314 and 316 are also staggered to align with the cavities 310 and 312, as previously described. The distance between each of the cavities 310 and 312 may be changed as desired. In many embodiments, it is desirable to place the cavities as close together as possible. However, the distance should not be so small that the cups 200 fuse together. Preferably, the distance between the cavities is between 0.10 and 0.60 inches. More preferably, the distance is between 0.25 and 0.50 inches. Most preferably, the distance is between 0.35 and 0.45 inches.

In a preferred embodiment, the temperature of each plate may be controlled in order to aid in the formation of the core 102. Controlling the temperature of each plate may be accomplished using a variety of methods. One such method is described in U.S. Pat. No. 6,096,255, which is incorporated herein by reference. Controlling the temperature of each plate allows for the manipulation of stages of the process including the cups 200 formation or determining whether the cups 200 remain in the cavities 310 and 312 or on the surface of the hemispherical protrusions 314 and 316. As will be appreciated by those skilled in the art, the temperature of each plate may be varied for a variety of reasons and may be changed according to a particular application.

In a preferred embodiment of the present invention, the outer layer 108 of the core is preferably made of thermoset rubber base materials, including those conventionally employed in golf ball cores. The conventional materials for such cores include compositions having a base rubber, a crosslinking agent, a filler and a co-crosslinking agent. The base rubber is typically a synthetic rubber like 1,4-polybutadiene having a cis-structure of at least 40%. Natural rubber, polyisoprene rubber and/or styrene-butadiene rubber may optionally be added to the 1,4-polybutadiene. The initiator included in the core composition can be any polymerization initiator which decomposes during the cure cycle. The crosslinking agent includes a metal salt of an unsaturated fatty acid such as sodium, zinc, lithiun or magnesium salt or an unsaturated fatty acid having 3 to 8 carbon atoms such as acrylic or methacrylic acid. The filler typically includes materials such as zinc oxide, barium sulfate, silica, calcium carbonate, zinc carbonate, regrind and the like.

Alternatively, the outer layer 108 may be comprised of thermoplastic elastomers such as a thermoplastic polyesterester, thermoplastic polyetherester, dynamically vulcanized thermoplastic elastomers, functionalized styrene-butadiene elastomers, thermoplastic urethanes or metallocene polymers or blends thereof.

The present invention is not limited to a particular outer layer 108 material, and the materials are well known to those of ordinary skill in the art. The present invention is generally directed to the use of a standard thermoset material, but those of ordinary skill in the art will easily recognize that when using thermoplastic materials, repeated heated above its melting temperature is acceptable.

In a preferred embodiment, the present invention uses strands of a desired material in order to form the outer layers 108. Prior methods have used preformed slugs to form dual core shells. This requires an elaborate plate handling method to ensure the preformed slugs are captured within each cavity. However, the present invention utilizes strands 500 of material, as shown in FIG. 5, in order to form hemispherical cups 200.

Figure 5:
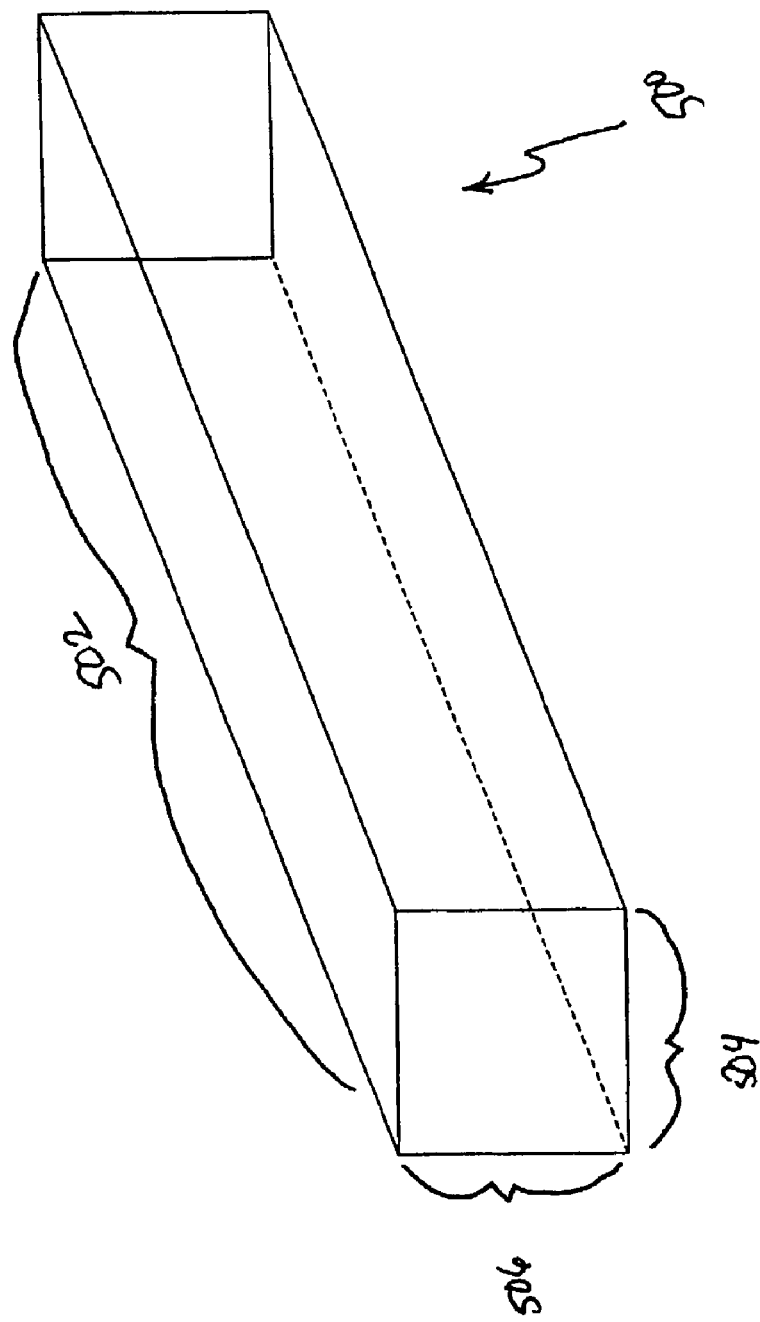
FIG. 5 is a diagram showing an exemplary strand according to the present invention.

The strands 500 are preferably rectangular in shape, as shown in FIG. 5. They may have any desired length 502, width 504 or height 506. In some embodiments, the length 502 of the strands 500 depend on the number of cavities 310 and 312 that are present on each plate 300 and 304. In a preferred embodiment, the width 504 of each strand may be determined according to the diameter of the cavities 310 and 312. Preferably, there should be enough material present in each strand 500 to form a cup 200 in each cavity 310 and 312. The amount of material may be altered by changing the width 504 of each strand 500, or alternately, by varying the height 506 of each strand. In other embodiments, the shape of the strands 500 may be varied as desired. In embodiments that use differently shaped plates 300, 302, and 304, the shape of the strands 500 may be changed to accommodate the plates.

Preferably, the length 502 of each strand 500 is between 10 and 36 inches. More preferably, the length 502 is between 20 and 30 inches. Most preferably, the length 502 is between 25 and 30 inches.

The width 504 of each strand 500 is preferably between 1 and 10 centimeters. More preferably, the width 504 is between 3 and 7 centimeters. Most preferably, the width 504 is between 4 and 6 centimeters.

The height 506 of each strand 500 is preferably between 1 and 10 centimeters. More preferably, the height 506 is between 3 and 7 centimeters. Most preferably, the height 506 is between 4 and 6 centimeters.

Figure 6:
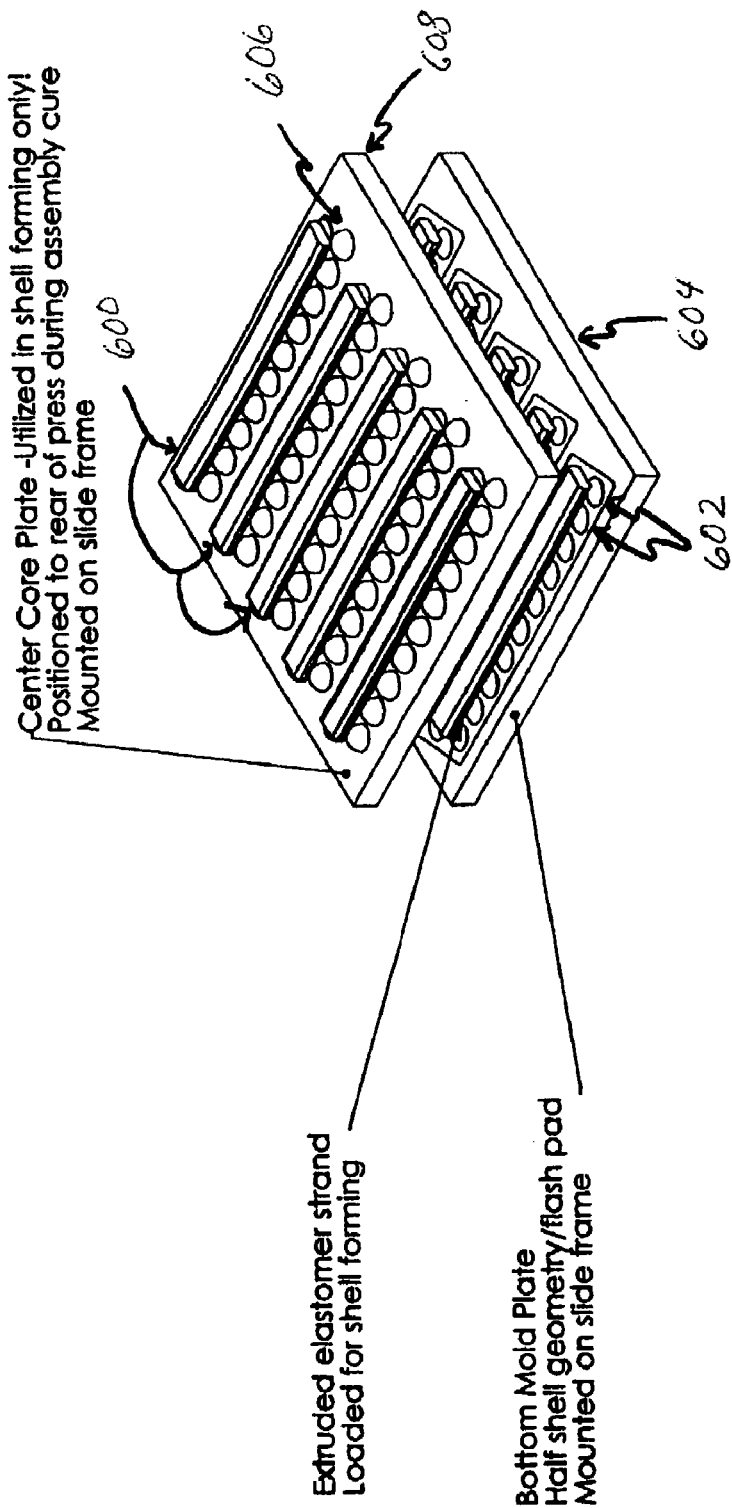
FIG. 6 is a diagram showing the exemplary placement of strands according to the present invention.

In a preferred embodiment, strands 600 are placed over the cavities 602 of the lower plate 604. Strands 600 are also placed over the hemispherical protrusions 606 of the center plate 608. Preferably, the strands are placed over the protrusions 606, as shown in FIG. 6. The strands 600 are preferably placed in an even manner whereby they evenly cover the cavities 602. The strands 600 are placed over the protrusions 606 of the center plate 608 in a substantially similar manner. Preferably, the strands 600 are placed so that they are stable and rest on the top of the protrusions 606.

In an exemplary embodiment, each plate may have a plurality of rows of cavities. In such embodiments, the strands 600 do not have to be placed directly over the cavities 602 and protrusions 606. In this embodiment, strands 600 may be placed so that they only partially cover each of two adjacent rows. The portion of each cavity 408 that is covered by the strands 600 may vary depending on the dimensions of the strands 600. When the plurality of cavities in a mold plate comprises more than two rows of cavities, an additional strand of material may be placed to partially cover each set of two adjacent rows. For example, when the plurality of cavities forms three rows, two strands of material may be used. The first strand may be placed to partially cover rows 1 and 2, while the second strand may be placed to partially cover rows 2 and 3.

Alternatively, a wide, relatively flat slab of material may be placed over the rows instead of using a plurality of strands of material. For instance, where the plurality of cavities forms more than two rows of cavities, a flat slab may cover the majority a middle row or rows, but only partially cover the outer rows formed by the plurality of cavities. The flat slab of material may have any shape. For instance, the slab of material may correspond generally to the shape formed by the plurality of cavities or to the general shape of a reservoir formed around the cavities. Preferably, however, the slab of material would have smaller dimensions and be configured such that there is sufficient excess material to form a pad around the molded cores without overloading the mold with excess material. Thus, the amount or volume of material in the slab may be sufficient to at least partially flow into a nearby reservoir without overflowing from the reservoir.

Figure 7:
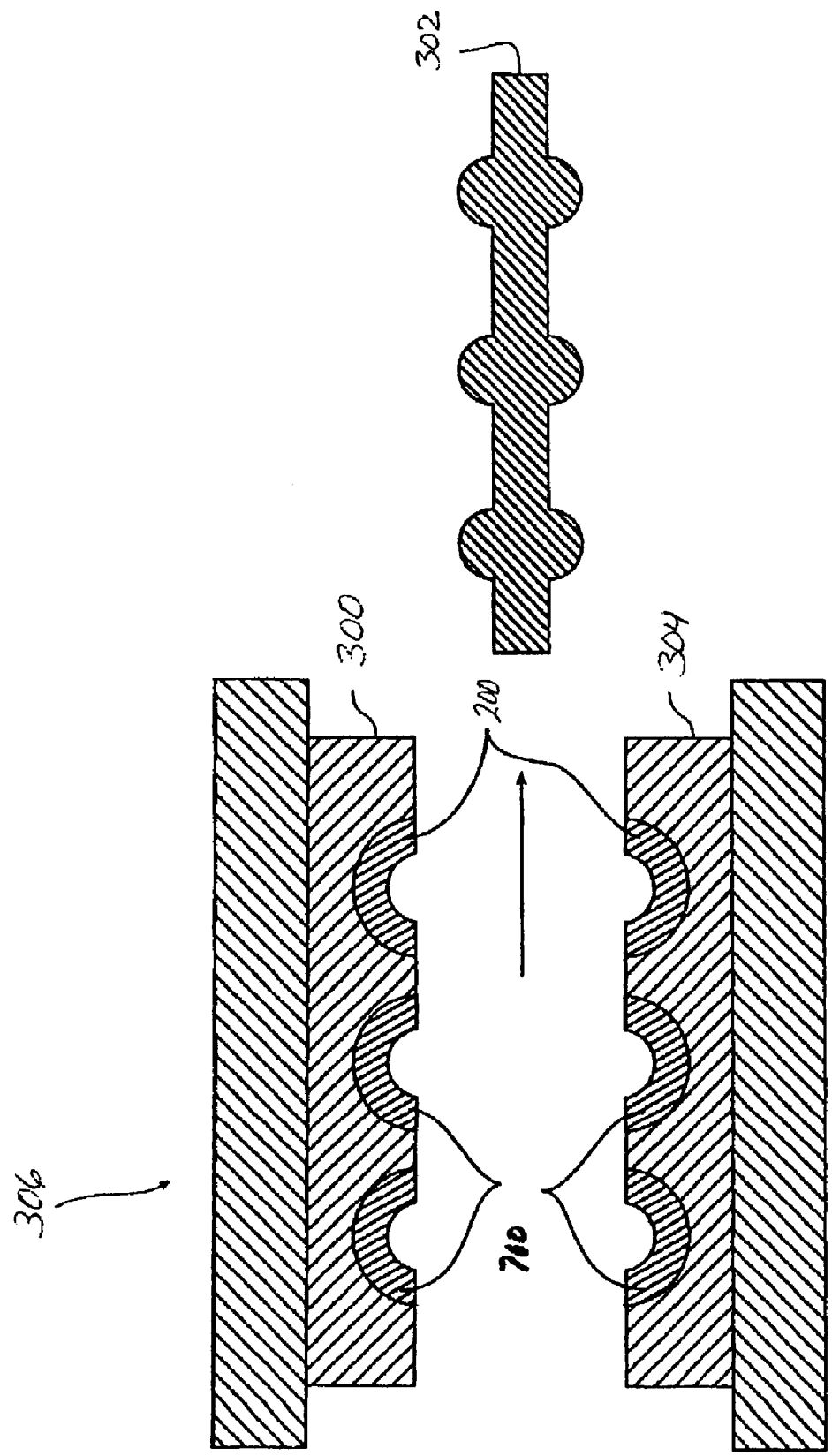
FIG. 7 is a diagram showing an exemplary formed outer layer according to the present invention.

Most preferably, the strips 500 are formed from a thermoset material, as set forth above. In forming the outer layer 108, the selected material is heated to a temperature that makes the material more pliable, but not to its cure activation temperature. Then, after a center 106 is inserted between the two hemispherical cups 700, shown in FIG. 7, the material is heated to a second temperature that is greater than the cure activation temperature of the material, allowing the two cups 700 to fuse together as they cure. Alternatively, for a thermoplastic material, the hemispherical cups 700 are heated until they are pliable and then cooled. Thereafter, the center 106 is inserted between the hemispherical cups 700 and the assembly is heated to a second temperature, above the melting temperature of the hemispherical cups 700, and thereafter cooled to solidify the thermoplastic material.

The cups 700 preferably have an outside diameter in the range of 80 to 98% of the finished ball diameter and an inner diameter in the range of 30 to 90% of the finished ball diameter. Preferably, the cups 700 have an inner diameter of approximately 0.5 to 1.51 inches and, more preferably, an inner diameter of approximately 0.75 to 1.4 inches. Preferably, the cups 700 have an inner diameter of approximately 0.9 to 1.25 inches. Golf balls incorporating these measurements can be designed with various attributes such as specific gravity, resiliency and hardness, to provide the desired playing characteristics, such as spin rate and initial velocity.

In a preferred embodiment, the formation of the core 102 comprises several steps. In such an embodiment, the top plate 300 is preferably fixed in place. The bottom plate 304 is preferably below the top plate 300, at a predetermined distance. Initially, the center plate is preferably away from the top and bottom plate, in any desired position.

Figure 8:
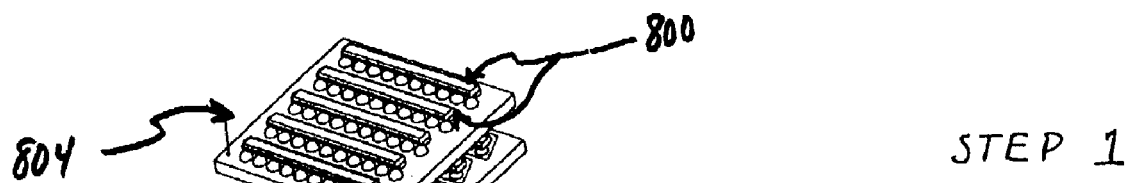
FIG. 8 is a diagram showing the exemplary steps according to the present invention.
Figure 8:
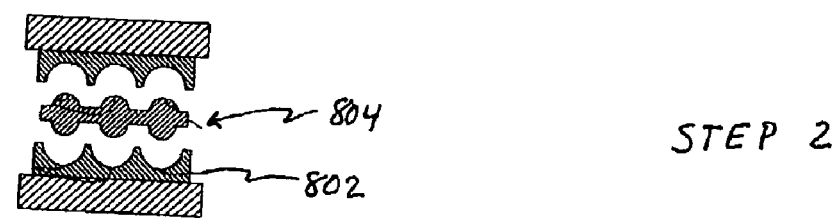
Figure 8:
Figure 8:
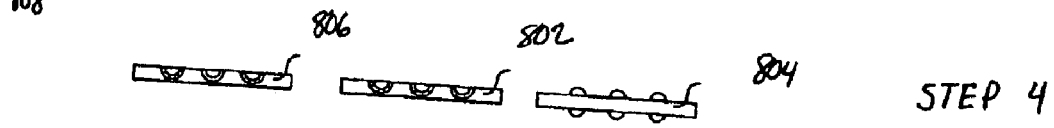
Figure 8:
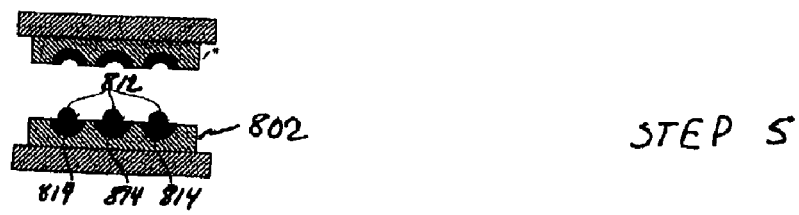

First, as shown in Step 1 of FIG. 8, strands 800 are placed over the concave cavities of the lower plate 802. The center plate 804 is then positioned in between the top and bottom plates so that the protrusions and the concave cavities are aligned, as shown in Step 2. Strands 800 are then placed over the protrusions of the center plate 804. Then referring to Step 3, the top 806, center 804 and bottom 802 plates move into a press, and then close to apply low heat and pressure.

Preferably, the assembly 808 shown in Step 3, is heated to a first temperature that makes the strands 800 significantly more pliable, but is below the cure activation temperature. Preferably, the temperature is greater than about 150 degrees F., but less that the cure activation temperature. The most preferred temperature is between about 190 degrees F. and 220 degrees F. The assembly 808 is compressed to a pressure sufficient enough to form cups 200 in the top 806 and bottom 802 plates, as shown in Step 4. Preferably, the assembly 808 is compressed using a hydraulic preforming pressure of about 230 psi. Using for example, a 28-inch diameter ram for the press that produces 142,000 pounds of force on a mold with 210 cavities, the pressure per cavity is about 675 pounds of force per cavity. However, one of ordinary skill in the art can vary the pressure. The assembly 808 is then cooled with cooling water that has a temperature between about 60 degrees F. to 100 degrees F. and more preferably between 77 and 82 degrees F.

After the cups 200 have been formed, the assembly 808 is removed from the press. The center plate 804 is then moved out of alignment. The cups that are formed are preferably kept in its respective cavities 310 and 312. In a preferred embodiment, the cups and the flash are more likely to remain in the top and bottom plates because of the pad that is formed in each of these plates. The pad makes it substantially unlikely that the material will adhere to the center plate or fall from the top plate. This eliminates the need for flipping the plates, as discussed in U.S. Pat. No. 6,096,225. In other embodiments, any known method, such as adjusting the temperature of the plates, may be used to keep the cups and flash in the top and bottom plates.

Then, turning to Step 5, the ball centers 812 are placed within the hemispherical cups 814 located in the bottom plate 802. The bottom plate 802 preferably remains in alignment with the top plate 806 throughout the process, except during loading and unloading. However, the bottom plate 802 may be moved vertically in order to aid in the removal of the center plate 804 and the placing of the centers 812 into the hemispherical cups 814. Once the centers 812 are placed in the cups the top 806 and bottom 802 plates are placed back into a press, heated and compressed again. This time, the bottom and top plates are heated to a temperature above the cure activation temperature of the cups 814. Preferably, the plates are heated to a temperature of greater than about 290 degrees F. Preferably, the plates are compressed using a hydraulic preforming pressure of about 2000 psi. Using for example, a 28-in diameter ram for the press that produces 1,231,000 pounds of force on a plate with 210 cavities, the pressure per cavity is about 1600 pounds of force per cavity. However, one of ordinary skill in the art can vary the pressure.

In some embodiments, an adhesive may be applied such that it bonds the center 106 to the cups 814. The adhesive is preferably placed within the outer layer 108 cup cavities and the adhesive is spread evenly on the center upon joining the cups to one another. A preferred adhesive for use with polybutadiene cups is an epoxy, formed by blending low viscosity liquid resins, and formulated to be flexible in its cured state. A suitable epoxy is formed by mixing an approximately 1:1 volume ratio of about 83 parts by weight of AB-82 hardener into 100 parts by weight of Epoxy Resin #1028, both of which are sold by RBC Industries, Inc. In its liquid state, the epoxy is ideal for use in metering, mixing, and dispensing equipment. This epoxy is preferably cured at 77 degrees F. for 18 to 24 hr, at 95 degrees F. for 6 hr, at 120 degrees F. for 3 hr, or at 150 degrees F. for 1 hr. The cured adhesive's physical properties resemble those of elastomeric urethane. It exhibits an Izod impact strength 5.50 ft-1$b$/in of notch, a tensile strength at 25 degrees C. of 2,200 psi, a compressive strength at 25 degrees C. of 6,000 psi, and a Shore D hardness of 45. Preferably, the Shore D hardness of the cured adhesive is within 20 Shore D of the hardness of the elastomeric cup material.

The temperatures and pressures used to form and subsequently fuse the cups 814 may vary depending on the type of strand 800 material that is used. For example, when using elastomeric strand material, the temperature used to fuse the cups is preferably sufficient to cause crosslinking between the elastomeric material. As will be appreciated by those skilled in the art, the temperature and pressure used in accordance with the present invention may be varied according to a particular application.

Any type of press may be used in accordance with the present invention. The type of press may be chosen based on a plurality of factors including the type of strand 800 material used, the desired temperatures and pressures, cost efficiency, and plate compatibility. One type of press is described in U.S. Pat. No. 6,290,797, which is incorporated herein by reference.

In some embodiments, there is a tendency for the cup 814 material to pull away from the edges of the concave cavities 310 and 312 as the hemispherical protrusions 314 and 316 are removed after molding the cups 814. The rim of the cavity and the face 218 of the protrusive part 204 can act as a pinch die, effectively shearing the thin layer of polybutadiene material remaining between the overflow groove and the cup. When the protrusive part 204 is removed, areas of the uncured polybutadiene cup where the thin overflow layer has been sheared, pull away from the cavity edges towards the hemispherical void formerly filled by the protrusive mold part, resulting in an out-of-round cup and subsequently an improperly placed core. By using a channel, described previously with respect to FIGS. 2$a$ and 2$b$, the cup material may flow over the edges of the concave cavity 202 during cup formation helping to maintain the structural integrity of the cup against the edges of the mold part. The channel allows excess cup material to be captured, in addition to the excess material that forms a lip extending into the groove 214, providing structural support for the cup, diminishing the tendency of the cup inside the concave cavity 202 to pull away from the walls or to be pinched off from the excess material outside the cavity. Benefits that result from employing a channel of material to aid in keeping the cup against the walls of the concave cavity 202 include, but are not limited to, diminished cooling requirements during cup formation, better centering of the hemispherical cavity upon molding, and reduced or eliminated need of reinforcing polymer material, such as trans-polyisoprene.

Because the polymer in the channel provides physical support for the cups during molding, two differing benefits result. The first benefit is an increased molding temperature. Previous methods often require limited molding temperatures because of cup pull-off at higher temperatures. The use of higher molding temperatures results in decreased cycle time (first heat, cooling, second curing heat) and lower overall energy input. The second benefit is the elimination or decrease in amounts of the reinforcing polymer material used in the cup formulations. Reinforcing polymeric material, such as polyisoprene, is typically added to aid in keeping the cups intact at the point of contact with the mold cavities. It is also a highly dampening material. The addition of the channel and subsequent physical support of the cups allows the reinforcing polymer material to be eliminated, if so desired, resulting in a faster golf ball (increased velocity). The elimination of the reinforcing polymer material, which is difficult to work with, also results in a much simpler and easier manufacturing process.

Once the core 102 has been formed, the top and bottom plates are preferably separated. The molded cores 102 are preferably left in the bottom plate 802. The plurality of cores are connected by the flash that flows in between the cavities of the lower plate 802 and the material that flows into the reservoir 400, as previously discussed. In a preferred embodiment, the entire mold may be removed from the lower plate. Having the cores 102 connected by the flash significantly reduces the chances of any of the cores 102 sticking to the cups 814 of the lower plate 802.

In a preferred embodiment, being able to remove the entire mold from the lower plate significantly reduces the time and expense associated with removing individual molds. Using prior methods, molded cores would often stick in a cavity. This would require each of the stuck cores to be removed manually, resulting in significant downtime and effort. The present invention eliminates cores being stuck to the cavities, thus eliminating this time consuming step.

In a preferred embodiment, once the entire pad and molded cores are removed from the lower plate, each core 102 may be hydraulically punched out of the mold. In other embodiments, any method may be used to separate the cores 102 from the mold. After the cores 102 are removed from the mold, they typically have a small amount of residual flash around the part of the core 102 where the two cups 814 were fused. In a preferred embodiment of the present invention, the amount of flash material is minimized. Additionally, in accordance with the present invention, the residual flash is substantially easier to remove, resulting in decreased complexity and cost. The residual flash may be removed by using any method known to those skilled in the art.

Once the residual flash is removed, the cores 102 may be used in any desired manner. In a preferred embodiment, a cover 104 is placed over the cores 102. The cover 104 provides the interface between the ball 100 and a club and other objects such as trees, cart paths, and grass. Properties that are desirable for the cover 104 include moldability, high abrasion resistance, high tear strength, high resilience, and mold release. The cover 104 can be comprised of polymeric materials such as ionic copolymers of ethylene and an unsaturated monocarboxylic acid which are available under the trademark "SURLYN" of E.I. Dupont De Nemours & Company of Wilmington, Del. or "IOTEK" or "ESCOR" from Exxon. These are copolymers or terpolynrers of ethylene and methacrylic acid or acrylic acid partially neutralized with zinc, sodium, lithium, magnesium, potassium, calcium, manganese, nickel or the like. The cover 104 generally provides sufficient strength for good performance characteristics and durability. Preferably, the cover 104 is of a thickness between about 0.03 inches and about 0.12 inches. More preferably, the cover 104 is about 0.04 to 0.09 inches in thickness. Most preferably, the cover 104 ranges from about 0.05 to 0.085 inches in thickness. In one preferred embodiment, the cover 104 can be formed from mixtures or blends of zinc, lithium and/or sodium ionic copolymers or terpolymers. The Surlyn® resins used in the cover 104 are ionic copolymners or terpolymers in which sodium, lithium or zinc salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

The present invention can likewise be used in conjunction with homopolymeric and copolymer materials such as:
(1) Vinyl resins such as those formed by the polymerization of vinyl chloride, or by the copolymerization of vinyl chloride with vinyl acetate, acrylic esters or vinylidene chloride.
(2) Polyolefins such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using single-site catalyst.
(3) Polyurethanes such as those prepared from polyols and diisocyanates or polyisocyanates and those disclosed in U.S. Pat. No. 5,334,673.
(4) Polyureas such as those disclosed in U.S. Pat. No. 5,484,870.
(5) Polyamides such as poly(hexamethylene adipamide) and others prepared from diamines and dibasic acids, as well as those from amino acids such as poly(caprolactam), and blends of polyamides with Surlyn, polyethylene, ethylene copolymers, ethyl-propylene-non-conjugated diene terpolymer, etc.
(6) Acrylic resins and blends of these resins with poly vinyl chloride, elastomers, etc.
(7) Thermoplastics such as the urethanes, olefinic thermoplastic rubbers such as blends of polyolefins with ethylene-propylene-non-conjugated diene terpolymer, block copolymers of styrene and butadiene, isoprene or ethylene-butylene rubber, or copoly (etheramide), such as PEBAX sold by ELF Atochem.
(8) Polyphenylene oxide resins, or blends of polyphenylene oxide with high impact polystyrene as sold under the trademark "Noryl" by General Electric Company, Pittsfield, Mass.
(9) Thermoplastic polyesters, such as polyethylene terephthalate. polybutylene terephthalate, polyethylene terephthalate/glycol modified and elastomers sold under the trademarks "Hytrel" by E.I. DuPont De Nemours & Company of Wilmington, Del. and "Lomod" by General Electric Company, Pittsfield, Mass.
(10) Blends and alloys, including polycarbonate with acrylonitrile butadiene styrene, polybutylene terephthalate, polyethylene terephthalate, styrene maleic anhydride, polyethylene, elastomers, etc. and polyvinyl chloride with acrylonitrile butadiene styrene or ethylene vinyl acetate or other elastomers. Blends of thermoplastic rubbers with polyethylene, propylene, polyacetal, nylon, polyesters, cellulose esters, etc.

Preferably, the cover 104 is comprised of polymers such as ethylene, propylene, butene-1 or hexane-1 based homopolymers and copolymers including functional monomers such as acrylic and methacrylic acid and fully or partially neutralized ionomer resins and their blends. methyl acrylate methyl methacrylate homopolymers and copolymers, imidized, amino group containing polymers, polycarbonate, reinforced polyamides, polyphenylene oxide, high impact polystyrene, polyether ketone, polysulfone, poly (plhenylene sulfide), acrylonitrile-butadiene, acrylic-styrene-acrylonitrile, poly(ethylene terephthalate), poly(butylene terephthalate), poly(ethelyne vinyl alcohol), poly (tetrafluoroethylienie) and their copolymers including functional comonomers and blends thereof. Still further, the cover 104 is preferably comprised of a polyether or polyester thermoplastic urethane, a thermoset polyurethane, a low modulus ionomer such as acid containing ethylene copolymer ionomers, including E/X/Y terpolymers where E is ethylene, X is an acrylate or methacrylate-based softening comonomer present in 0–50 weight percent and Y is acrylic or methacrylic acid present in 5–35 weight percent. More preferably, in a low spin rate embodiment designed for maximum distance, the acrylic or methacrylic acid is present in 15–35 weight percent, making the ionomer a high modulus ionomer. In a high spin embodiment, the acid is present in 10–15 weigh percent or a blend of a low modulus ionomer with a standard ionomer is used.

While it is apparent that the illustrative embodiments of the invention herein disclosed fulfill the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

The invention claimed is:

1. A method for forming a golf ball having a multilayer core, comprising:
forming a first plurality of shells, wherein the steps for forming the first plurality of shells comprise:
placing a first strand of layer material over a first mold plate, wherein the first mold plate defines a first plurality of cavities and wherein the first strand of layer material is placed over more than one of the first plurality of cavities;
placing a center plate over said first mold plate, wherein said center plate defines a first plurality of protrusions on a first side of the center plate, and wherein said first plurality of protrusions are substantially aligned with said first plurality of cavities on said first mold plate;
compressing the first strand of layer material between said first mold plate and said center plate so that it at least partially fills said first plurality of cavities to form said first plurality of shells;
forming a second plurality of shells, wherein the steps for forming the second plurality of shells comprise:
placing a second strand of layer material over more than one of a second plurality of protrusions on a second side of said center plate, wherein said second plurality of protrusions on the second side of the center plate are substantially aligned with said first plurality of protrusions;

placing a second mold plate over said center plate, wherein said second mold plate defines a second plurality of cavities that are substantially aligned with said second plurality of protrusions on said center plate;

compressing the second strand of layer material between said center plate and said second mold plate to form said second plurality of shells;

wherein the steps of compressing said first and second strands of layer material are performed at substantially the same time.

2. The method according to claim 1, further comprising the steps of:

removing said center plate after forming said first and second plurality of shells;

placing a plurality of centers into the first plurality of shells while the shells are still in the first mold plate;

compressing the first and second plurality of shells around the centers.

3. The method of claim 1, wherein the first plurality of shells are connected by a first pad of excess layer material from said first strand that flows between said first plurality of cavities during compression of the first layer material.

4. The method of claim 1, wherein the second plurality of shells are connected by a second pad of excess layer material from said second strand that flows between said second plurality of cavities during compression of the second layer material.

5. The method of claim 3, wherein the second plurality of shells are connected by a second pad of excess layer material from said second strand that flows between said second plurality of cavities during compression of the second layer material, and further comprising the steps of:

removing said center plate after forming said first and second plurality of shells;

placing a plurality of centers into the first plurality of shells while the first and second plurality of shells are still in the first and second mold plate;

compressing the first and second plurality of shells around the centers to form a plurality of multilayer golf ball cores.

6. The method of claim 5, wherein the first and second pads of excess material are joined during the compression of the first and second plurality of shells to form said plurality of multilayer golf ball cores, wherein the joined first and second pads form a third pad having a thickness from about 0.015 to about 0.30 inch.

7. The method of claim 6, wherein the thickness of the third pad is from about 0.2 to about 0.25 inch.

8. The method of claim 5, wherein the physical properties of material within 0.125 inch of a parting line of the first golf ball layer are within 15 percent of the physical properties of material forming a pole of the golf ball layer.

9. The method of claim 5, wherein the physical properties of material within 0.125 inch of a parting line of the first golf ball layer are within 10 percent of the physical properties of material forming a pole of the golf ball layer.

10. The method of claim 5, wherein the physical properties of material within 0.125 inch of a parting line of the first golf ball layer are substantially similar to the physical properties of material forming a pole of the golf ball layer.

11. The method of claim 6, further comprising the step of removing said third pad and said plurality of multilayer cores simultaneously without separating said third pad from said multilayer cores.

12. The method of claim 11, wherein the step of removing said third pad and said plurality of multilayer cores comprises pulling on the third pad to release the multilayer cores.

13. The method of claim 11, further comprising the step of transferring said third pad and plurality of multilayer cores as a single unit from a first processing location to a second processing station.

14. The method of claim 13, further comprising the step of separating the third pad from said plurality of multilayer cores at said second processing station.

15. The method of claim 14, wherein the third pad is reground to form layer material.

16. The method of claim 5, further comprising the step of forming an intermediate layer over said multilayer core.

17. The method of claim 16, wherein said intermediate layer is a wound layer.

18. The method of claim 16, wherien said intermediate layer is injection molded around said multilayer core.

19. The method of claim 16, further comprising the step of forming a cover around said intermediate layer.

20. The method of claim 19, wherein said cover comprises polyurethane or polyurea.

21. The method of claim 19, wherein said cover is formed from a castable reactive liquid material.

22. The method of claim 19, wherein said cover comprises a thermoplastic material.

* * * * *